United States Patent [19]

Feldstein

[11] Patent Number: 5,248,475
[45] Date of Patent: Sep. 28, 1993

[54] METHODS FOR ALLOY MIGRATION SINTERING

[75] Inventor: Robert S. Feldstein, Pelham, N.Y.

[73] Assignee: Derafe, Ltd., Buffalo, N.Y.

[21] Appl. No.: 781,835

[22] Filed: Oct. 24, 1991

[51] Int. Cl.⁵ .............................. B22F 1/02; B22F 3/12
[52] U.S. Cl. ......................................... 419/35; 419/38; 419/45; 419/46; 419/47
[58] Field of Search .................. 419/23, 24, 35, 44, 419/45, 46, 47, 53, 64, 38

[56] References Cited

U.S. PATENT DOCUMENTS

| | | | |
|---|---|---|---|
| 4,011,077 | 3/1977 | Kaufman | 75/212 |
| 4,060,414 | 11/1977 | Kaufman | 73/246 |
| 4,289,833 | 9/1981 | Hachisuka | 428/544 |
| 4,375,994 | 3/1983 | Amin | 148/11.5 P |
| 4,430,295 | 2/1984 | Jandeska, Jr. | 419/46 |
| 4,552,719 | 11/1985 | Morimoto et al. | 419/2 |
| 4,591,480 | 5/1986 | Morishita et al. | 419/9 |
| 4,620,872 | 11/1986 | Hijikata et al. | 75/246 |
| 4,743,425 | 5/1988 | Ohsaki et al. | 419/16 |
| 5,124,120 | 6/1992 | Sklarchuck et al. | 419/47 |

Primary Examiner—Donald P. Walsh
Assistant Examiner—Daniel Jenkins
Attorney, Agent, or Firm—Beveridge, DeGrandi, Weilacher & Young

[57] ABSTRACT

Methods are provided for fabricating a sintered and solid element from an otherwise unsinterable material, utilizing the property of that material that it will form an eutectic composition or alloy with a suitable alloying agent at a temperature which is below the plastic deformation temperature of the material. Discrete particles of the material to be sintered—such as grains or wire pieces—are coated with a thin coating of the alloying agent and are packed into the position where they are to be sintered. Then, the coated grains or wire pieces are heated so that at least the coating and the regions of the grains just below the coating are slowly raised in temperature. Diffusion regions of the alloying agent into the grains of the sinterable material will then occur. Further heating continues so that at least the diffusion regions increase in temperature to just slightly above the eutectic melting point. Localized melting of the diffusion regions occurs where the eutectic concentration is reached, and adjacent grains therefore begin to share the localized melting regions and become mutually wet. The alloying agent then continues to diffuse, and drops in concentration, so that it freezes out of the localized melting regions. The melting point of the melting regions therefore tends to rise, and the wetted melted regions freeze to form a sintered and solid element.

35 Claims, No Drawings

METHODS FOR ALLOY MIGRATION SINTERING

FIELD OF THE INVENTION

This invention relates to methods of alloy migration sintering whereby sintered and solid elements of an otherwise unsinterable material, combined with a surface coating of a suitable alloying agent, may be formed. The invention provides methods by which various solid elements of the otherwise unsinterable material may be produced, not the least of which is electrodes for batteries.

BACKGROUND OF THE INVENTION

Fusion of eutectic compositions is a well-known phenomenon. Fusion essentially means melting, and eutectic fusion describes the phenomenon of a combination of two materials at a generally closely defined temperature which is well below the melting point of either of those materials itself. Thus, the melting point of the first material lowers as some quantity of the second material is added to it, until a certain temperature called the eutectic melting point, which is the lowest melting point for the particular composition. Thereafter, as the ratio of the two elements is increased in the favour of the second element, the melting point again begins to arise. The composition at which the lowest melting point occurs is the eutectic composition, and is expressed in terms of percentages of the two elements or materials being alloyed.

A typical, and very well known, eutectic composition is one which the present invention particularly utilizes in a principal application of the invention. That is the eutectic composition of tin and lead, which occurs when there is a mixture of 37% of lead with 63% of tin. Its eutectic melting point is 361° F.

A number of other elements and materials exist, however, for which eutectic compositions can be made of those materials together with suitable alloying agents. They include numerous ferrous materials such as nickel vanadium steel, refractories, certain ceramics, and so on.

Because the eutectic melting point of a eutectic composition of a material together with its alloying agent occurs at a temperature below the melting point of either the material or the alloying agent itself, as a composition comprising a material together with an alloying agent increases in temperature, it will first reach the eutectic melting point for that combination of materials and the mixture becomes molten. When the mixture becomes molten, it becomes wet, so that a certain amount of flow of the molten eutectic composition can be expected to occur. It is these features of which the present invention is particularly cognizant, and the application of those features in a quite unexpected manner results in the production of solid compositions which are primarily of a first material or element, together with a small portion of another material or element which is an alloying agent for the first material under the correct—and controllable—conditions.

The present invention is particularly directed to materials which are, in general, unsinterable, and where a sintered and solid element of that material is desired to be produced. Solid elements made of a sintered material are generally quite frangible, and may have a very high porosity and high effective surface area. This may be particularly useful in such purposes and conditions as negative plates for lead acid batteries. The negative plate of a lead acid battery has, as its active component, elemental lead; the positive plate, of course, has lead oxide as its active component, where the electric couple between the plates is effected in the presence of an acidic electrolyte.

Other purposes to which the present invention may be directed include any kind of situation where a eutectic composition can be made of a material together with an alloying agent, where the liquid and therefore wet eutectic mixture at the eutectic melting point can be utilized in such a manner that adjacent wetted or melted areas may be joined together. Due to the nature of eutectic compositions, if the temperature of the wetted and melted areas of the eutectic composition is maintained at a temperature just above the eutectic melting point, then diffusion of the alloying agent into the material will continue, so that the ratio of the alloying agent and the material changes with the amount of the alloying agent remaining in the melted area becoming less. This drives up the melting point of that ratio of the composition, and the composition begins to "freeze" or "resolidify" because it is now below its melting point. Of course, it is recognized that the words "freeze" and resolidify, in the present context, applies to a composition that may be at a relatively high elevated temperature compared with, say, room temperature.

In any event, utilizing the phenomenon discussed above provides a means whereby surface treating and welding or surface joining (also identified as soldering in certain circumstances) may be achieved.

Thus, the present invention will provide sintered and solid elements which might be essentially self standing, although frangible. More usually, however, the present invention is utilized to provide a sintered and solid element which may otherwise secured to a supporting structure of some sort. Indeed, the present invention can be utilized in such a manner that a sintered and solid element can be formed in a bounded volume so as to join two other surfaces that protrude into that bounded volume, together. A typical example may be bonding two facing surfaces together, or two facing ends of wire together, using a suitable volume bounding agent in the sense of a tinker's dam.

Indeed, in some respects it is convenient to consider the alloying agent for the otherwise unsinterable material somewhat in the context of that as a dopant. However, the alloying agent may serve the purpose of a dopant in the sense of a modifier by which the functioning characteristics of a material such as dendrite suppression that has been doped are changed; but it does serve the purpose of being a melting point modifier, by which the melting point of the wetted and melted areas will be changed. Thus, the production of a solid and sintered element from an otherwise unsinterable material is effected by following the present invention. Refractory materials, such as those used as the target electrode in an X-Ray tube may thus be produced; it being noted that those refractory materials are not otherwise sinterable, and that the presence of a small quantity of the alloying agent would not harm and might enhance the X-Ray tube operation.

DETAILED DISCUSSION

The present invention is described below, with specific reference to several typical examples of the manner in which the present invention is utilized.

In the production of plates for lead acid batteries, particularly negative plates, it is desirable to effect a porous metal structure. This provides a high effective plate area, and thus a high exposure to electrolyte. Of course, in all circumstances, there may be a specific solid-to-pore distribution that is desirable, with pore sizes that may be especially effective. Those matters are beyond the scope of the present invention. However, it is clear from the present invention that the selection of appropriate grain size and the selection of appropriate ratios of the material of the solid element to be produced and its alloying agent, will produce consistently reproducible results. Particularly in such circumstances as the negative plate of a lead acid battery which is formed of elemental lead, very suitable solid to void or pore ratios with a high degree of void to void interconnection, may be achieved.

Of course, it has been noted that many other materials than lead may be used in carrying out the present invention, but a convenient illustration of the present invention is provided by the lead active layer of the negative plate of a lead acid battery.

As with many materials such as lead, the production of a porous metal matrix may not be easily accomplished because the material is not easily sintered. It is well known, for example, that lead has a thermal plastic range below its melting point over a wide temperature range, so that if pressed lead powder is attempted to be sintered, it will slump. of course, there is no point in melting the lead powder, because then a solid lead body results. Thus, lead is essentially unsinterable.

If lead grains are placed in a mold, as is a common manufacturing process, the initial voids between the grains will be filled or reduced in size as the lead powder slumps during its plastic deformation range below the melting point of the lead.

However, if individual lead powder grains are coated with an alloying agent such as tin, with a relatively small or thin coating of tin compared to the diameter of the lead grain, then a molten eutectic solder comprising 63% tin and 37% lead will result as the temperature is raised and diffusion produces a eutectic surface having a comparatively small melted surface volume which is comprised of the tin and an automatically appropriate amount of lead and tin required to arrive at the eutectic melting point and the eutectic composition. Therefore, if coated grains are placed together, and then heated—of course, the source of heat is outside the coated grains so that they are exposed to the source of heat—then there will be a temperature or thermal gradient occur within the individual coated lead grains. The energy input thereby powers a phase change of the eutectic composition of tin and lead, and at that point the liquid temperature would be stabilized by the heat of fusion within the phase transition layer which is comprised of the eutectic composition. Continued exposure to heat thereby results only in a rate of rise of the temperature which is quite low as additional melting occurs, and the system which comprises the eutectic composition of tin and lead becomes essentially isothermal. At that point, diffusion continues and the eutectic layer thickens, until tin exhaustion occurs.

As the diffusion continues, the molten surface then becomes mixed with increasing amounts of lead, and the lead content approaches the eutectic quantity of 37%, which thereby causes melting of the whole eutectic surface of the lead with tin. At that point, intergrain wetting and bonding by intermixture of the adjacent wetted diffusion regions occurs.

However, further diffusion occurs, which then reduces the tin content at the surface, and that raises the melting point of the localized wetted regions. Resolidification or freezing then ensues.

By controlling the rate of temperature rise, the temperature overshoot above the eutectic melting point, the duration of time at which the temperature is maintained just above the eutectic melting point, and then the rate of fall of the temperature, the tin concentration profile within the manufactured sintered and solid element can be controlled.

By following the above, it can be seen that a sintered lead matrix or structure has been achieved, with optimum distribution of the expensive eutectic alloying agent, namely tin, so that the costs of production may be maintained as low as possible. Moreover, the surface concentration of the tin, which may be beneficial to the functioning of a lead acid battery, can be controlled without the cost of substantial quantities of tin being present.

The unsinterable material from which a sintered and solid element may be produced in keeping with the present invention may be used in other forms than granular, as discussed above with respect to tin coated lead grains. Indeed, in the broadest sense, the present invention calls for the use of discrete pieces of the unsinterable material, which discrete pieces have been coated with a suitable eutectic alloying agent.

The discrete pieces may be particles or grains of the unsinterable material. However, they might equally be fibres or pieces of wire of the unsinterable material; and those fibres or pieces of wire may be chopped pieces of fibre or wire, or lengths of wire, or platelets, discs, etc. For example, wire of an unsinterable material such as titanium might be coated with a very thin coating of niobium, or nickel vanadium steel wire might be plated with a thin coating of nickel, and then the coated wire is chopped into short, fine pieces. Alternatively, the wires could be woven into a mesh, and then the mesh could be crushed or pressed so that the coated wires are crushed or pressed together at least at the points where individual strands of the coated wire cross one another. If chopped wire is used, it may be coated with the eutectic alloying agent either before or after it has been chopped. Moreover, the coating may be placed on the discrete pieces or particles—whether they are grains, chopped pieces of wire, lengths of wire, crimped fibres, extruded sections, etc., of the unsinterable material—by any suitable means such as plating, dipping, milling, etc.

From the above, the principle steps of the method of the present invention, whereby a sintered and solid element may be fabricated from an unsinterable material which has the property that an alloy of that material can be made using an alloying agent and where diffusion of the alloying agent into the unsinterable material will occur at a first temperature below that at which plastic deformation of the unsinterable material will occur. The unsinterable material has a further property that a eutectic melting point of a eutectic composition of the unsinterable material and the alloying agent exists at a temperature below the plastic deformation range of the unsinterable material—its slump temperature, or especially in the instance of certain ceramics, their structural failure temperature. The present invention, in its fundamental form, comprises the following steps:

(a) coating discrete pieces of the unsinterable material with a thin coating of the alloying agent;

(b) packing the discrete pieces into a position—a bounded volume, or onto a backing and supporting structure, for example—where the coated grains are to be sintered so as to form the sintered and solid element being fabricated;

(c) exposing the discrete pieces to a source of heat so that at least the coating and the regions of those discrete pieces just below the alloying agent coating on those discrete pieces is slowly raised in temperature towards a first temperature below which plastic deformation of the underlying unsinterable material will occur—its slump temperature—so that diffusion of the alloying agent into the discrete pieces of the unsinterable material will thereby occur and so as to thereby form diffusion regions at the interface of the coating and the unsinterable material, with a eutectic composition of the alloying agent and the unsinterable material occurring within the diffusion regions;

(d) thereafter, further exposing the discrete pieces of unsinterable material to sufficient heat that at least the diffusion regions of those discrete pieces increase in temperature to a second temperature which is slightly above the eutectic melting point, whereby localized melting and thickening of the diffusion regions occurs so as to form molten surfaces on the discrete pieces that comprise substantially isothermal eutectic compositions, stabilized by the heat of fusion and thickened by further heat absorption, whereby adjacent grains begin to share the localized melting regions and become mutually wet;

(e) maintaining the second temperature substantially constant, whereby the alloying agent continues to diffuse, thereby lowering the concentration of the alloying agent in the molten surfaces and raising the melting point thereof, so as to cause the molten surfaces to re-solidify, so that the wetted melted regions will freeze and adjacent discrete pieces of the unsinterable material will bond one to another, thereby achieving fabrication of a sintered and solid element of the unsinterable material; and (f) thereafter, removing the then fabricated sintered and solid element away from the heat, or removing the heat away from the sintered and solid element, so that the sintered and solid element is permitted to cool.

It is particularly advantageous that the unsinterable material may be chosen from the group which consists of lead, ferrous metals, ferrous alloys, unsinterable ceramics, unsinterable refractories, nickel vanadium steels, and lead calcium or lead antimony alloys.

However, while not limited thereto, the present invention is particularly directed to lead, ferrous metals and alloys, nickel vanadium steels, lead calcium alloys, and cobalt and titanium based alloys, where a suitable alloying agent from which eutectic compositions may be formed may be tin, calcium, nickel, silver, niobium, gold, and rare earths. Unsinterable ceramics and refractories of suitable ceramic and refractory materials with suitable alloying agents, particularly for such uses as high energy wave guides or heat shielding for re-entry of space vehicles into the atmosphere, anodes for X-Ray tubes and klystrons, etc., are also within the scope of the fabrication methods of the present invention.

Of course, when the unsinterable material is lead, as would be the case when battery plates for lead acid batteries are being fabricated, the alloying agent would normally be tin. The lead may contain a calcium or antimony additive, but a eutectic composition of that alloy with tin will be reached and will have a specific eutectic temperature lower than the melting point of the lead or of tin.

In some instances, it may be possible that ions of the unsinterable material have been implanted on a substrate by such surface treatment steps as ion implantation by ion bombardment, plasma spraying, electroplating, pressure coating, and flame spraying, followed by sintering at least a portion or all of ion implanted surface. Thereafter, the remaining amount of the discrete pieces or particles, if any, would be used to fabricate the sintered and solid element by sintering them with the first portion. Therefore, the alloy migration techniques of the present invention are used to bond the otherwise unsinterable material to a surface as well as to itself in a sintered structure, by appropriate surface preparation.

In general, fabrication may first be preceded in step (b) by placing at least a portion of the coated discrete pieces or particles of the unsinterable material on a substrate and heat bonding that portion of the coated discrete pieces or particles of unsinterable material to the substrate, followed by further placement of the remaining amount of the unsinterable material. The first sintered layer that exists at this point may have an additional quantity of the alloying agent coated or plated onto it. Still further, the heat bonding may be heat and pressure bonding, since "cold flow" of many materials becomes more efficient as the lower limit of the plastic flow range of that material is approached.

When it is desired, for example, to weld or join two facing surfaces or two facing ends of pieces of wire, as noted above, a suitable boundary may be constructed to contain the coated discrete pieces or particles of unsinterable material during the process of sintering and fabrication of the solid element by which the two adjoining surfaces or ends of wire are effectively welded together. Thus, what is effectively a tinker's dam is prepared of a suitable material such as an uncured or unfired ceramic, the coated discrete pieces of the unsinterable material are placed in the volume bounded by the tinker's dam, and the steps of the present invention are carried out.

Surface treatment, for example such as by plasma flame spraying, followed by the alloy migration sintering techniques of the present invention, would thus form a particular type of a graded junction weld having a controllable gradient and thus having predictable properties, between surfaces as well as between particles.

By properly dimensioning the depth of coating on the discrete pieces or particles of the unsinterable material, the quantity of the alloying agent present in the fabricated sintered and solid element may be closely controlled. Thus, in the case of a tin/lead compound, effectively a eutectic tin/lead solder comprising 63% tin and 37% lead, and having a eutectic melting point of 361° F., may be arrived at. Moreover, the final ratio of tin to lead within the fabricated total sintered and solid element may be controlled so as to be in the range of, say, 1:10 to 1:1,000 or even up to 1:1,000,000. The surface concentration of the alloying agent may have a relatively high value, with a controlled depth profile of concentration. Thus, for example, the use of expensive tin as the alloy migration sintering agent for lead is very effective, but the amount of tin used may be sufficiently low that no appreciable increase in cost has occurred while at the same time a sintered and solid element has been fabricated. Indeed, there may be sufficient surface tin concentration so as to initially aid in dendrite suppression.

Indeed, the present invention lends itself to a number of other purposes than simply the production of a sintered and solid element from an otherwise unsinterable material. For example, by the proper steps of surface coating so as to bond a metal that will form a eutectic with an alloying agent, and then plating or otherwise placing the alloying agent on the treated surface, and thereafter following the steps to create diffusion of the bonded metal into the substrate and the formation of eutectic composition of the metal with its alloying agent, a similar result to "case hardening" (i.e., case coating) can be obtained over the material of the substrate.

Still further, a metallic element having a carbon based reinforcing fibre, where the fibre is carbon based for example, may be fabricated using the principals of the present invention. The carbon fibre may be chosen from the group consisting of graphite, pyrolytic graphite, and carbon; and the metal must have the properties that it may be ion implanted on a substrate—in this case, the carbon fibre. Moreover, the metal must be such that it forms a eutectic with an alloying agent.

In that case, the metal is ion implanted in a shallow layer at the surface of the carbon fibre, and then a thin coating of the alloying agent is placed (such as by plating) over the ion implanted metal. The thus treated carbon fibre is then exposed to or packed with discrete pieces of the metal, in a volume having the form of the metallic element which is to be fabricated. An example is that the treated carbon fibre may be cut or chopped into small pieces, and mixed into a volume of discrete particles of the metal so that the metallic element is a cast element. A specific example would be a cast lead electrode which is reinforced with carbon fibre. Thus, the metallic element being formed may have porosity, or it may be solid (non-porous).

Thereafter, the fabrication follows the usual steps that the metal, the alloying agent, and the ion implanted metal on the carbon fibre substrate are exposed to a source of heat so that they are slowly raised in temperature towards a first temperature where the alloying agent will diffuse into the ion implanted metal and into the discrete pieces or particles of the metal packed around the carbon fibres, and thereby form diffusion regions at the interfaces between the ion implanted metal and the discrete pieces or particles with the alloying agent. A eutectic composition of the metal and the alloying agent occurs within the diffusion regions. Thereafter, the structure is exposed to sufficient heat that at least the diffusion regions increase in temperature to a second temperature which is slightly above the eutectic melting point, and thereby localized melting of the diffusion regions occurs so as to form molten regions which comprise substantially isothermal eutectic compositions. Thus, the adjacent discrete pieces or particles of the metal and the ion implanted metal on the carbon fibres, begin to share localized molten regions and become mutually wet.

Then, as taught above, that second temperature is maintained substantially constant so that the alloying agent continues to diffuse into the discrete pieces of the metal and into the ion implanted metal on the carbon fibre substrate, thereby lowering the concentration of the alloying agent in the molten regions and raising the melting point thereof since it is no longer at the eutectic mixture. Thus, the molten regions re-solidify, and thereby the fibre reinforced metal structure is fabricated.

The metal may be ion implanted into the carbon fibre, or onto surfaces as discussed hereafter, to a depth of up to 150 atoms, but typically to about 10 to 20 atoms, with a thickness of perhaps 1 to 3 atoms above the surface of the carbon fibre or the otherwise treated surface. The alloying agent may easily be plated over the metal.

In yet an alternative approach to the fabrication of a fibre reinforced structure, the fibres—which may be chopped fibre—may simply be added to a liquid bath of the metal from which the structure is to be fabricated. The fibres may be plated with a eutectic alloying agent for the metal of the liquid metal bath, or in some instances the fibres may themselves be fabricated from or comprise the eutectic alloying agent. In some instances, the fibres might be boron-based fibres, or they may be superalloy fibres such as titanium-uranium alloys.

A structure may be fabricated by joining two opposed surfaces together, following steps in keeping with the present invention, whereby the two opposed surfaces are essentially "soldered" or "brazed" or welded together. The steps are much the same as discussed above, in that a metal is used that will bond to the opposed surfaces and which will form a eutectic composition with an alloying agent. As before, a eutectic composition of the metal and the alloying agent must exist, and it must have a eutectic melting point at a temperature which is below the plastic deformation or damage (or structural failure) range of the material of the surfaces to be joined. Indeed, such surfaces may be those of polymers, especially nonisotropic or anizotropic conductive polymers.

Here, the metal which is to be used as the joining metal is bonded to each of the opposed surfaces, and then a thin coating of the alloying agent is placed—such as by plating—over the metal which has been bonded to each of the opposed surfaces to be joined. The surfaces are such that they may be placed close together and are closely mated with each other; either in the first instance or if they are somewhat irregular then after the steps of bonding the joining metal and placement of the alloying agent, they must at least have complimentary mating topologies. Alternatively, an intermediate particulate coated powder layer might be employed.

Thereafter, at least the opposed surfaces are exposed to a source of heat so that the metal and the alloying agent are slowly raised in temperature towards the eutectic melting point, and thus diffusion of the alloying agent into the metal will occur, thereby forming diffusion regions, of course, a eutectic composition of the joining metal and the alloying agent occurs within the diffusion regions. Thereafter, as described above, the opposed surfaces and the metal and alloying agents with them are exposed to sufficient heat that at least the diffusion regions increase in temperature to a second temperature which is slightly above the eutectic melting point. Thus, localized melting of the diffusion regions occurs so as to form molten regions which comprise substantially isothermal eutectic compositions, and the opposed surfaces then begin to share those localized molten regions and become mutually wet. Afterwards, the second temperature is maintained substantially constant so that the alloying agent continues to diffuse into the joining metal, thereby lowering the concentration of the alloying agent in the molten regions and raising the melting point thereof. This causes the molten regions, as discussed above, to re-solidify. Therefore, the opposed surfaces are bonded one to the other and are permanently joined together, of course, then the permanently joined surfaces and the source of heat are removed from each other so that the unitary structure which is thereby formed from the permanently joined surfaces and any underlying structures associated with them, is permitted to cool.

The metal that is used may be chosen from the group consisting of lead, ferrous metals, ferrous alloys, ceramics, refractories, nickel vanadium steels, lead calcium alloys, lead antimony alloys, cobalt based alloys, and titanium based alloys. The alloying agent may therefore by any one of the group consisting of tin, calcium, nickel, silver, niobium, gold, and rare earths.

The metal may be bonded to the surfaces which are to be joined together by such surface treatment steps as ion bombardment, plasma spraying, electroplating, pressure coating, and plane spraying. It has been noted that if the metal is ion implanted to each of the opposed surfaces, it may be done to a depth of up to 150 atoms, but typically in the range of 10 to 20 atoms, with a thickness of perhaps 1 to 3 atoms above the surfaces, and that the alloying agent may then be plated over the ion implanted metal.

Where the surfaces being joined may, themselves, form eutectic mixtures with a eutectic alloying agent, then it is clear that it is necessary only to place the eutectic alloying agent over the mating surfaces, place the surfaces together, and follow the heating and steeping steps of the present invention as described above. In that manner, eutectic "bonding" or "welding" of the facing surfaces is achieved. These steps are particularly useful in the event of ferrous surfaces and the like.

The scope of the present invention is defined by the appended claims.

What is claimed is:

1. A method of fabricating a sintered and solid element from an unsinterable material which has the property that an alloy of that material can be made using an alloying agent and where diffusion of the alloying agent into the unsinterable material will occur at a first temperature below that at which plastic deformation of the unsinterable material will occur, and further having the property that a eutectic melting point of a eutectic composition the unsinterable material and the alloying agent exists at a temperature below the plastic deformation range of the unsinterable material, which method comprises the steps of:
    (a) coating discrete pieces of said unsinterable material with a thin coating of said alloying agent;
    (b) packing said discrete pieces into a position where they are to be sintered to form a sintered and solid element;
    (c) exposing said discrete pieces to a source of heat so that at least the coating and the regions of said discrete pieces just below said alloying agent coating are slowly raised in temperature towards said first temperature, so that diffusion of said alloying agent into the discrete pieces of the unsinterable material will occur, and thereby form diffusion regions at the interface between said coating and said unsinterable material, with a eutectic composition of said unsinterable material and said alloying agent occurring within said diffusion regions;
    (d) thereafter, further exposing said coated discrete pieces of said unsinterable material to sufficient heat that at least said diffusion regions of said discrete pieces increase in temperature to a second temperature slightly above said eutectic melting point, so that localized melting and thickening of said diffusion regions occurs so as to form molten surfaces of said discrete pieces, said molten surfaces comprising substantially isothermal eutectic compositions, whereby adjacent discrete pieces begin to share the localized melting regions and become mutually wet;
    (e) maintaining said second temperature substantially constant, whereby said alloying agent continues to diffuse, thereby lowering the concentration of said alloying agent in said molten surfaces and raising the melting the melting point thereof, so as to cause said molten surfaces to re-solidify, thereby bonding adjacent discrete pieces of said unsinterable material with fabrication of a sintered and solid element thereof being achieved; and p1 (f) thereafter, removing said sintered and solid element and said source of heat away from each other so that said sintered and solid element is permitted to cool.

2. The method of claim 1, wherein said coated discrete pieces are chosen from the group consisting of particles, grains, fibres, chopped pieces of wire, lengths of wire of said unsinterable material, platelets, and discs.

3. The method of claim 1, wherein said coated discrete pieces are lengths of wire of said unsinterable material that have been previously coated or plated with said alloying agent and thereafter have been woven into a mesh, and thereafter crushed or pressed together at least a-F the points where individual strands of said wire cross one another.

4. The method of claim 1, wherein said coated discrete pieces are pieces of wire of said unsinterable material that have been previously coated or plated with said alloying agent and thereafter have been cut or chopped into small pieces.

5. The method of claim 2, wherein said unsinterable material is chosen from the group consisting of lead, ferrous metals, ferrous alloys, ceramics, refractories, nickel vanadium steels, lead calcium alloys, lead antimony alloys, cobalt based alloys, and titanium based alloys.

6. The method of claim 5, wherein said alloying agent may be any one of the group consisting of tin, calcium, nickel, silver, niobium, gold, and rare earths.

7. The method of claim 1, wherein said coated discrete pieces are grains of lead, and said alloying agent is tin.

8. The method of claim 5, wherein at least a portion of said coated discrete pieces of said unsinterable material are heat bonded to a substrate as a constituent first part of step (b), followed in step (b) by further placement of the remaining amount of said unsinterable material to be used to fabricate said sintered and solid element.

9. The method of claim 5, wherein at least a portion of said coated discrete pieces of said unsinterable material are heat bonded to a substrate as a constituent first part of step (b), followed in step (b) by placement of a further small quantity of said alloying agent with said discrete pieces.

10. The method of claim 5, wherein at least a portion of said coated discrete pieces of said unsinterable material are heat and pressure bonded to a substrate as a constituent first part of step (b), followed in step (b) by further placement of the remaining amount of said unsinterable material to be used to fabricate said sintered and solid element.

11. The method of claim 8, wherein said coated discrete pieces are grains of lead, and said alloying agent is tin.

12. The method of claim 10, wherein said coated discrete pieces are grains of lead, and said alloying agent is tin.

13. The method of claim 5, wherein step (b) is carried out by placing said coated discrete pieces into a tinker's dam surrounding the area between two ends of wire to be joined together.

14. The method of claim 7, wherein sufficient tin is coated on grains of lead to form a eutectic tin/lead solder of 63% tin and 37% lead, with a eutectic melting point of 361° F.; and wherein the final ratio of tin to lead in the fabricated sintered and solid element formed thereby is in the range of 1:10 to 1:1,000,000.

15. The method of claim 8, wherein said discrete pieces are lead coated with tin, and said eutectic composition is a eutectic tin/lead solder of 63% tin and 37% lead, with a eutectic melting point of 361° F.; and wherein the final ratio of tin to lead in the fabricated sintered and solid element formed thereby is in the range of 1:10 to 1:1,000,000.

16. The method of claim 9, wherein said discrete pieces are lead coated with tin, and said eutectic composition is a eutectic tin/lead solder of 63% tin and 37% lead, with a eutectic melting point of 361° F.; and wherein the final ratio of tin to lead in the fabricated sintered and solid element formed thereby is in the range of 1:10 to 1:1,000,000.

17. The method of claim 10, wherein said discrete pieces are lead coated with tin, and said eutectic composition is a eutectic tin/lead solder of 63% tin and 37% lead, with a eutectic melting point of 361° F.; and wherein the final ratio of tin to lead in the fabricated sintered and solid element formed thereby is in the range of 1:10 to 1:1,000,000.

18. The method of claim 5, wherein at least a portion of said coated discrete pieces of said unsinterable material are bonded to a substrate that has been previously surface treated with the implantation of ions of said unsinterable material on said surface, followed by sintering at least a portion of said coated discrete pieces to the implanted unsinterable material by following steps (c), (d), and (e), all as a constituent first part of step (b); followed in step (b) by further placement of any remaining amount of said unsinterable material to be used to fabricate said sintered and solid element.

19. The method of claim 7, wherein at least a portion of said coated grains of lead are bonded to a substrate that has been previously surface treated by one of the group of surface treatment steps consisting of ion bombardment, plasma spraying, electroplating, pressure coating, and flame spraying, so as to implant ions of lead on said surface, followed by sintering at least a portion of said coated discrete pieces to the implanted unsinterable material by following steps (c), (d), and (e), all as a constituent first part of step (b); followed in step (b) by further placement of any remaining amount of said unsinterable material to be used to fabricate said sintered and solid element.

20. The method of claim 7, wherein at least a portion of said coated grains of lead are bonded to a substrate that has been previously surface treated by one of the group of surface treatment steps consisting of ion bombardment, plasma spraying, electroplating, pressure coating, and flame spraying, so as to implant ions of lead on said surface, followed by sintering at least a portion of said coated discrete pieces to the implanted unsinterable material by following steps (c), (d), and (e), all as a constituent first part of step (b); followed in step (b) by placement of a further small quantity of tin on the sintered layer of lead, and thereafter by further placement of any remaining amount of said coated lead grains and further execution of steps (c), (d), (e), and (f).

21. A method of fabricating a metallic element having a carbon based reinforcing fibre embedded therein, where said carbon fibre is chosen from the group consisting of graphite, pyrolytic graphite, and carbon; and where said metal has the properties that it may be ion implanted on a substrate and that it forms a eutectic with an alloying agent; wherein said eutectic has a eutectic melting point at a temperature below the plastic deformation range of said metal, said alloying agent, and said carbon fibre; which method comprises the steps of:

(a) ion implanting a shallow layer of said metal at the surface of said carbon fibre, and thereafter placing a thin coating of said alloying agent over said ion implanted metal;

(b) packing discrete pieces of said metal around the ion implanted surface of said carbon fibre in a volume having the form of the metallic element to be fabricated;

(c) exposing said discrete pieces of said metal, said alloying agent and said ion implanted metal to a source of heat so that they are slowly raised in temperature towards a first temperature where said alloying agent will diffuse into said ion implanted metal and into said discrete pieces of said metal, and thereby so as to form diffusion regions at the interface between said ion implanted metal and said discrete pieces with said alloying agent, and so that a eutectic composition of said metal and said alloying agent occurs within said diffusion regions;

(d) thereafter, further exposing said discrete pieces of said metal, said alloying agent, and said ion implanted metal to sufficient heat that at least said diffusion regions increase in temperature to a second temperature slightly above said eutectic melting point, so that localized melting of said diffusion regions occurs so as to form molten regions which comprise substantially isothermal eutectic compositions, whereby adjacent discrete pieces and ion implanted metal begin to share localized molten regions and become mutually wet;

(e) maintaining said second temperature substantially constant whereby said alloying agent continues to diffuse into said discrete pieces and said ion implanted metal, thereby lowering the concentration of said alloying agent in said molten regions and raising the melting point thereof, so as to cause said molten regions to re-solidify, thereby bonding said carbon fibre and said discrete pieces with fabrication of solid metallic element having a carbon based reinforcing fibre embedded therein; and (f) thereafter, removing said metallic element and said source of heat from each other so that said solid metallic element is permitted to cool.

22. The method of claim 21, wherein said coated discrete pieces are chosen from the group consisting of particles, grains, fibres, chopped pieces of wire, lengths of wire of said unsinterable material, platelets, and discs.

23. The method of claim 22, wherein after step (a) and before step (b), said carbon fibre is chopped or cut into a plurality of short pieces; wherein step (b) is carried out by mixing said plurality of short pieces of carbon fibre into a volume of discrete pieces of said metal; and wherein said metallic element is cast.

24. The method of claim 22, wherein step (a) is carried out so that said metal is ion implanted in said carbon fibre to a depth of about 10 to 20 atoms, and to a thickness of 1 to 3 atoms thick over the surface of said carbon fibre; and wherein said alloying agent is plated over said metal.

25. The method of claim 22, where said metal is lead and said alloying agent is tin.

26. A method of permanently joining together a pair of opposed surfaces by using a joining metal that has the properties that it will bond to the material of the surfaces to be joined and that it wi.11 form a eutectic composition with an alloying agent; wherein the eutectic compositions of said joining metal and said alloying agent has a eutectic melting point at a temperature below the plastic deformation range of the material of the surfaces to be joined, which method comprises the steps of:

(a) bonding a coating of said joining metal to each of said opposed surfaces to be permanently joined together;

(b) placing a thin coating of said alloying agent over said joining metal on each of said opposed surfaces to be joined;

(c) placing said opposed surfaces together so that they are closely mated to each other, and exposing said opposed surfaces to a source of heat so that at least the joining metal and the alloying agent are slowly raised in temperature towards said eutectic melting point so that diffusion of said alloying agent into said joining metal will occur, and thereby form diffusion regions within said joining metal, with a eutectic composition of said joining metal and said alloying agent occurring within said diffusion regions;

(d) thereafter, exposing said opposed surfaces, said joining metal, and said alloying agent to sufficient heat that at least said diffusion regions increase in temperature to a second temperature slightly above said eutectic melting point, so that localized melting of said diffusion regions occurs so as to form molten regions which comprise substantially isothermal eutectic composition, whereby said opposed surfaces begin to share localized molten regions and become mutually wet;

(e) maintaining said second temperature substantially constant whereby said alloying agent continues to diffuse into said joining metal, thereby lowering the concentration of said alloying agent in said molten regions and raising the melting point thereof, so as to cause said molten regions to re-solidify, thereby bonding said opposed surfaces so as to permanently join them together; and (f) thereafter, removing said permanently joined surfaces and said source of heat from each other so that the unitary structure thereby formed by said permanently joined surfaces and any underlying structures associated with them is permitted to cool.

27. The method of claim 26, wherein said coated discrete pieces are chosen from the group consisting of particles, grains, fibres, chopped pieces of wire, lengths of wire of said unsinterable material, platelets, and discs.

28. The method of claim 27, wherein at least one of said opposed surfaces is irregular prior to step (a), and after step (b) said opposed surfaces having complementary mating topologies.

29. The method of claim 27, wherein said joining metal is chosen from the group consisting of lead, ferrous metals, ferrous alloys, ceramics, refractories, nickel vanadium steels, lead calcium alloys, lead antimony alloys, cobalt based alloys, and titanium based alloys.

30. The method of claim 29, wherein said alloying agent may be any one of the group consisting of tin, calcium, nickel, silver, niobium, gold, and rare earths.

31. The method of claim 27, wherein said joining metal is lead, and said alloying agent is tin.

32. The method of claim 27, wherein said joining metal is bonded to each of said opposed surfaces by one of the group of surface treatment steps consisting of ion bombardment, plasma spraying, electroplating, pressure coating, and flame spraying.

33. The method of claim 27, wherein step (a) is carried out so that said joining metal is ion implanted in each of said opposed surfaces to a depth of 10 to 20 atoms, and to a thickness of 1 to 3 atoms above said surfaces; and wherein said alloying agent is plated over said joining metal.

34. The method of claim 33, wherein said joining metal is lead, and said alloying agent is tin.

35. The method of claim 26, wherein step (b) alternatively includes the step of placing an intermediate particulate coated powder layer between said opposed surfaces.

* * * * *